United States Patent
Morimoto et al.

(10) Patent No.: US 9,607,514 B2
(45) Date of Patent: Mar. 28, 2017

(54) DRIVE ASSIST DEVICE (71) Applicant: TOYOTA JIDOSHA KABUSHIKI KAISHA, Toyota-shi (JP)

(72) Inventors: Kazuhiro Morimoto, Toyota (JP); Katsuhiro Matsuoka, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/881,278

(22) Filed: Oct. 13, 2015

(65) Prior Publication Data

US 2016/0148508 A1 May 26, 2016

(30) Foreign Application Priority Data

Nov. 21, 2014 (JP) .................................. 2014-237118

(51) Int. Cl.
*B60R 1/00* (2006.01)
*G08G 1/096* (2006.01)
*G08G 1/0962* (2006.01)
*B60K 37/00* (2006.01)
*G08G 1/0967* (2006.01)

(52) U.S. Cl.
CPC ............. *G08G 1/096* (2013.01); *B60K 37/00* (2013.01); *G08G 1/09675* (2013.01); *G08G 1/096716* (2013.01); *G08G 1/096783* (2013.01)

(58) Field of Classification Search
CPC ...... B60R 1/00; B60R 2300/30; G08G 1/096; G08G 1/0962; G08G 1/0967; G08G 1/096708; G08G 1/096725; B60K 37/00

USPC .......................... 701/117–119; 340/901, 905
See application file for complete search history.

(56) References Cited

U.S. PATENT DOCUMENTS

| 8,972,076 B2* | 3/2015 | Ogawa | G08G 1/096716 340/901 |
| 2005/0134478 A1* | 6/2005 | Mese | G08G 1/096716 340/901 |
| 2006/0009188 A1* | 1/2006 | Kubota | G08G 1/096725 455/344 |
| 2009/0115632 A1* | 5/2009 | Park | G08G 1/092 340/905 |

(Continued)

FOREIGN PATENT DOCUMENTS

| JP | 2011-090379 A | 5/2011 |
| JP | 2011-113385 A | 6/2011 |

(Continued)

*Primary Examiner* — Tyler J Lee
(74) *Attorney, Agent, or Firm* — Oblon, McClelland, Maier & Neustadt, L.L.P.

(57) ABSTRACT

A drive assist device assists a driver who is driving a vehicle by showing, on a display unit, information related to an indication state of a traffic signal including a remaining time until the indication state of the traffic signal changes. The drive assist device includes a processor configured to output a representation of the remaining time to the display unit. The processor is configured to set the representation of the remaining time to a first representation when the remaining time is greater than a predetermined value and set the representation of the remaining time to a second representation when the remaining time is less than or equal to the predetermined value. The second representation differs from the first representation in at least one of brightness, saturation, and hue.

10 Claims, 4 Drawing Sheets

(56) References Cited

U.S. PATENT DOCUMENTS

| | | | |
|---|---|---|---|
| 2011/0090094 A1* | 4/2011 | Yamada | G08G 1/095 340/905 |
| 2011/0093178 A1 | 4/2011 | Yamada et al. | |
| 2011/0254701 A1* | 10/2011 | Yamada | G08G 1/095 340/905 |
| 2013/0110316 A1* | 5/2013 | Ogawa | G08G 1/096716 701/1 |
| 2015/0046055 A1 | 2/2015 | Yamada et al. | |
| 2015/0262483 A1* | 9/2015 | Sugawara | G08G 1/0962 340/929 |

FOREIGN PATENT DOCUMENTS

| | | |
|---|---|---|
| JP | 4968383 | 7/2012 |
| JP | 4973787 | 7/2012 |

* cited by examiner

DRIVE ASSIST DEVICE

BACKGROUND ART

The present invention relates to a drive assist device that assists a driver who is driving a vehicle by showing, on a display unit, information related to an indication state of a traffic signal.

Recent drive assist devices assist a driver who is driving a vehicle by using traffic information that is obtained through, for example, road-to-vehicle communication or vehicle-to-vehicle communication.

Japanese Patent No. 4968383 discloses one example of such a drive assist device that shows information related to an indication state of a traffic signal located in front of a vehicle in the traveling direction of the vehicle. The drive assist device obtains information related to an indication state of a traffic signal, for example, the remaining time of a red light, through road-to-vehicle communication. Then, the drive assist device outputs, to an output device such as a display, the remaining time until the indication state changes. The drive assist device is configured so as not to indicate the information related to the remaining time when the remaining time before the indication state changes becomes less than or equal to a predetermined value. This deters the driver from suddenly starting or accelerating the vehicle in synchronism with when the indication state changes.

Display units are now provided in a variety of forms. For example, a display unit may be provided as a flat panel display arranged in an instrument panel, a head-up display located in the driver's field of view, and a display for a navigation system. In particular, frequent changes of a representation shown on a display unit located in or near the driver's field of view may cause flickering when the display unit dims. This would be annoying to the driver. It is thus desirable that a drive assist device be capable of showing information on a display unit without annoying the driver regardless of where the display unit is located in the passenger compartment.

SUMMARY OF THE INVENTION

It is an object of the present invention to provide a drive assist device that shows, on a display unit, information related to an indication state of a traffic signal without annoying a driver.

A drive assist device according to one embodiment of the present invention assists a driver who is driving a vehicle by showing, on a display unit, information related to an indication state of a traffic signal including a remaining time until the indication state of the traffic signal changes. The drive assist device includes a processor configured to output a representation of the remaining time to the display unit. The processor is configured to set the representation of the remaining time to a first representation when the remaining time is greater than a predetermined value and set the representation of the remaining time to a second representation when the remaining time is less than or equal to the predetermined value. The second representation differs from the first representation in at least one of brightness, saturation, and hue.

A drive assist device according to another embodiment of the present invention assists a driver who is driving a vehicle by showing, on a display unit, information related to an indication state of a traffic signal including a remaining time until the indication state of the traffic signal changes. The drive assist device includes a processor configured to output a representation of the remaining time to the display unit. The processor is configured to determine whether the vehicle is travelling or stopped, set the representation of the remaining time to a first representation when the vehicle is stopped, and set the representation of the remaining time to a second representation when the vehicle is travelling. The second representation differs from the first representation in at least one of brightness, saturation, and hue.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of a drive assist device according to the present invention and applied to a vehicle will now be described.

Figure 1:
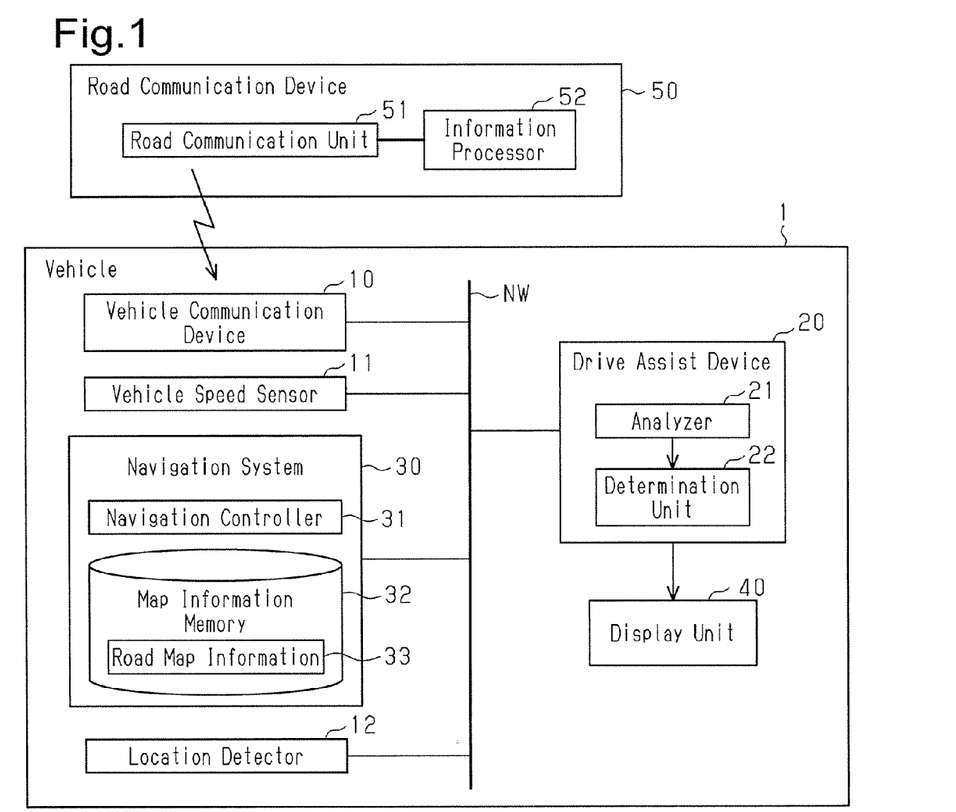
FIG. 1 is a block diagram showing the schematic configuration of a first embodiment to which a drive assist device according to the present invention is applied.

The schematic structure of a vehicle 1 will now be described with reference to FIG. 1. The vehicle 1 includes a vehicle communication device 10, which performs wireless communication with a road communication device 50, which is arranged on a road. The road communication device 50 is a communication device such as an optical beacon or a radio wave beacon. The vehicle communication device 10 is connected to an in-vehicle network NW such as a controller area network (CAN).

The road communication device 50 transmits infrastructure information to a vehicle that passes through the communication area of the road communication device 50. The infrastructure information includes traffic signal information related to an indication state of a vehicle traffic signal located in front of a vehicle travelling in the communication area in the traveling direction of the vehicle. The traffic signal information is synchronized with an indication state, which shows indication changes of the traffic signal. The traffic signal information includes, for example, the location of a traffic signal being subject to information provision, a distance or an average travelling time from the communication area to the traffic signal, the traveling direction from the road communication device 50 to the traffic signal, and a traffic signal cycle that shows an indication cycle of the traffic signal information.

The vehicle 1 includes a drive assist device 20 and a display unit 40, which shows an image based on an instruction from the drive assist device 20. The drive assist device 20 is connected to the in-vehicle network NW and includes a computer including a computation unit and a memory, that is, a processor. The computation unit processes a program or a parameter that is stored in the memory to execute various types of control. The drive assist device 20 functions as a controller and a travelling determination unit.

The drive assist device 20 includes an analyzer 21 and a determination unit 22. The analyzer 21 and the determination unit 22 have software functions executed by a processor in accordance with programs. The analyzer 21 analyzes the traffic signal information that is received by the road communication device 50 and extracts an indication time of the red light, which instructs "stop." The red light is one example of a first indication state.

Based on the indication time of the red light, the determination unit 22 calculates a remaining time T1 until the light changes from red to green to instruct "proceed." The determination unit 22 then outputs a representation conforming to the remaining time T1 to the display unit 40. The green light is one example of a second indication state.

The display unit 40 is, for example, a flat panel display, which is arranged in an instrumental panel, or a head-up display, which projects an image on a panel arranged on or near a windshield.

The vehicle 1 includes a navigation system 30. The navigation system 30 includes a navigation controller 31 and a map information memory 32. The navigation controller 31 is connected to the in-vehicle network NW and includes a computer that includes a calculation unit and a memory. The navigation controller 31 shows, on the display of the navigation system 30, different images such as one used to guide a route. The representation conforming to the remaining time T1 of the drive assist device 20 may be shown on the display of the navigation system 30.

The navigation controller 31 obtains information that shows the current location from a location detector 12, which is connected to the in-vehicle network NW. The location detector 12 includes, for example, a satellite navigation antenna, such as a global positioning system (GPS) antenna, and obtains a location using the latitude and longitude. For example, the navigation controller 31 identifies the current location of the vehicle 1 by using information that is obtained from the location detector 12, the speed of the vehicle 1 that is obtained from a vehicle speed sensor 11, and the bearing of the vehicle obtained from a bearing sensor (not shown).

The map information memory 32 stores road map information 33. The road map information 33 includes node information, which relates to a node that is set at an intersection or a crossroad, and link information, which relates to a link that connects two adjacent nodes. A node and a link are associated with an absolute location such as the latitude and longitude. The navigation controller 31 compares a current location of the vehicle 1 with the node information and the link information so that the current location of the vehicle 1 matches a location on the road. Then, the navigation controller 31 outputs the matched road location to the drive assist device 20.

The road communication device 50 will now be described. The road communication device 50 includes an information processor 52 and a road communication unit 51. The information processor 52 is a device that obtains traffic signal information by communicating with a controller or a center that controls the indication cycle of a traffic signal. Alternatively, the information processor 52 is a device that controls the indication cycle of a traffic signal by itself. The information processor 52 processes information such as the location of a traffic signal being subject to information provision, a distance or an average drive time to the traffic signal, the traveling direction, and a traffic signal cycle, so that the information is treated as traffic signal information conforming to a predetermined format for road-to-vehicle communication.

Figure 2:
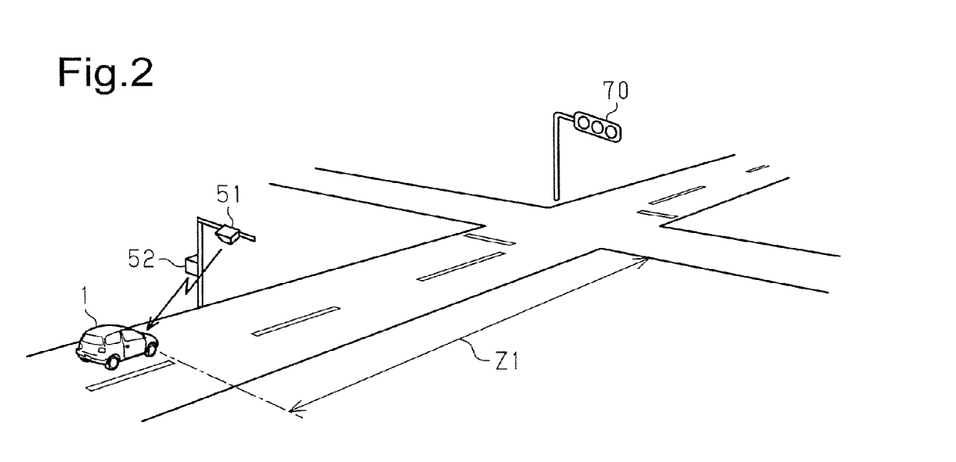
FIG. 2 is a schematic view showing an assist area in which a vehicle of FIG. 1 is capable of showing traffic signal information.

As shown in FIG. 2, the road communication unit 51 is installed in front of an intersection where a traffic signal 70 is provided. The road communication unit 51 transmits infrastructure information that includes traffic signal information of the traffic signal 70 to the vehicle in the communication area. The vehicle 1 that enters the communication area of the road communication unit 51 receives the infrastructure information from the vehicle communication device 10. More specifically, the vehicle communication device 10 functions as a receiver that receives traffic signal information including information related to the remaining time until the indication state of a traffic signal changes.

The drive assist device 20 of the vehicle 1 assists driving by showing, on the display unit 40, traffic signal information of infrastructure information. For example, the drive assist device 20 outputs, to the display unit 40, a representation of the remaining time until the indication state of the traffic signal changes, so that the drive assist device 20 shows the representation on the display unit 40. An assist area Z1, where the drive assist is performed, is set to an area that extends, for example, from a location that receives traffic signal information to an intersection where the traffic signal 70 is provided. When the vehicle 1 passes through the assist area Z1 or is diverted from the assist area Z1, the traffic signal information is no longer shown on the display unit 40. The assist area Z1 only needs to be located before the traffic signal 70.

Figure 3:
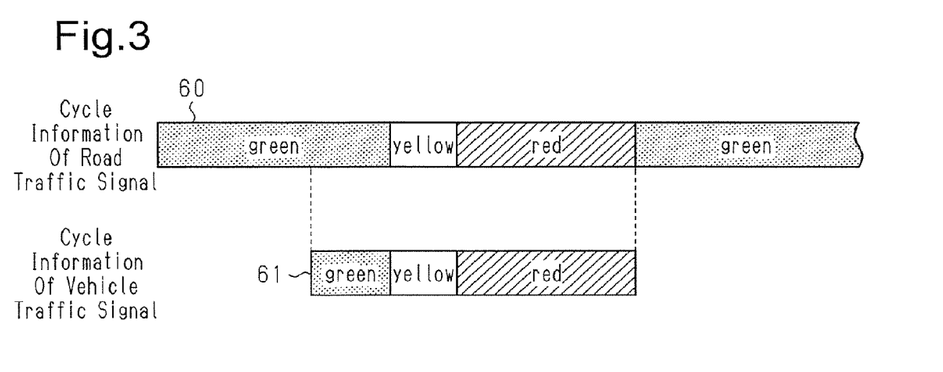
FIG. 3 is a schematic diagram showing one example of the configuration of traffic signal cycle information that is obtained by a road communication device of FIG. 1 and traffic signal cycle information that is transmitted to the vehicle.

The information related to the traffic signal cycle included in the traffic signal information will now be described with reference to FIG. 3. The information processor 52 obtains the current light and the remaining time of the current light as a traffic signal cycle. The information processor 52 also obtains an indication time of the light that follows to the current light. When the traffic signal corresponding to the road communication device 50 sets the green light, the yellow light, and the red light as a single cycle, traffic signal cycle information 60 of the road communication device 50 includes, for example, the remaining time of the green light, which is the current light, the indication time of the yellow light, which follows the green light, and the indication time of the red light, which follows the yellow light. The traffic signal cycle information 60 also includes the indication time of the next cycle.

When transmitting traffic signal information to the vehicle 1 in a communication area, the information processor 52 generates traffic signal cycle information 61, which corresponds to a single cycle that starts from when the transmission is performed. Then, the information processor 52 transmits the traffic signal information including the traffic signal cycle information 61. For example, if the green light is shown when transmitting traffic signal information, the information processor 52 transmits the remaining time, which is from when the transmission is performed to when the green light ends, the indication time of the yellow light, and the indication time of the red light.

The traffic signal information representation shown by the drive assist device 20 will now be described. When receiving traffic signal information, the drive assist device 20 determines whether or not the current light is red from the traffic signal information. The drive assist device 20 shows a representation based on traffic signal information when the current light is red. The drive assist device 20 does not show a representation based on the traffic signal information when the current light is not red.

The determination unit 22 of the drive assist device 20 determines whether or not the remaining time T1 of the red light, which is analyzed by the analyzer 21, is less than or equal to a predetermined value Tp. The predetermined value Tp is set to a value that deters the driver from suddenly starting the vehicle in synchronism with when the light changes from red to green. For example, the predetermined value Tp is set to ten seconds or less.

When the current light is red and the remaining time T1 of the red light is greater than the predetermined time Tp, the determination unit 22 generates representation data showing traffic signal information and outputs the representation data to the display unit 40. The representation data includes the remaining time T1 of the red light.

Figure 4:
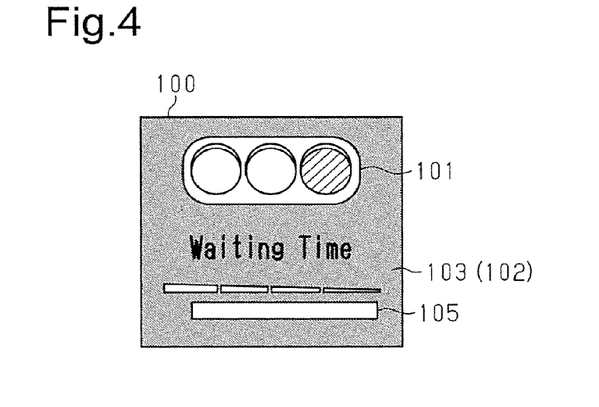
FIG. 4 shows a traffic signal information representation that is shown on a display unit of FIG. 1 when the remaining time of the red light is greater than a predetermined value.

FIG. 4 shows a traffic signal information representation 100, which is shown when the remaining time T1 of the red light is greater than the predetermined value Tp. The traffic signal information representation 100 shows a light representation 101, which shows that the current light is red, and a remaining time representation 103, which shows the remaining time of the red light. The background of the traffic signal information representation 100, which is the base of the traffic signal information representation 100, is black or gray. The color of the light representation 101 differs from that of the background. That is, the light representation 101 is shown in blue or green for the green light, yellow for the yellow light, and red for the red light.

The remaining time representation 103 includes a bar representation 105, which shows the remaining time in length, and a guide representation such as "waiting time," which describes that the bar representation 105 is the remaining time of the red light. The bar representation 105 is one example of a symbolic representation. The bar representation 105 and the guide display such as "waiting time" are shown to be highly visual, that is, the bar representation 105 and the guide representation such as "waiting time" differ from the background of the traffic signal information representation 100 in at least one of brightness, saturation, and hue. For example, the bar representation 105 and the guide representation such as "waiting time" may be shown in white or a non-achromatic color, which includes white, gray, and black.

The length of the bar representation 105 decreases (shape changes) though the remaining time decreases. Thus, the driver may roughly understand the remaining time of the red light when looking at the bar representation 105.

When the current light is red and the remaining time T1 of the red light is less than or equal to the predetermined value Tp, the remaining time representation needs to be interrupted to prompt the driver to look at, for example, the road or the traffic signal located in front of the vehicle. When the driver looks away from the traffic signal information representation 100, it is desired that the driver do not look at the traffic signal information representation 100 again.

For example, when the entire traffic signal information representation 100 or the remaining time representation 103 is switched to a representation that prompts the driver to look ahead or when the remaining time representation 103 is deleted, the switching of the representation configuration would significantly change the dimming rate and cause flickering. In particular, when the display unit 40 is arranged in or near the driver's field of view, the traffic signal information representation 100 would flicker whenever the vehicle 1 approaches a traffic signal. This would be annoying to the driver.

Figure 5:
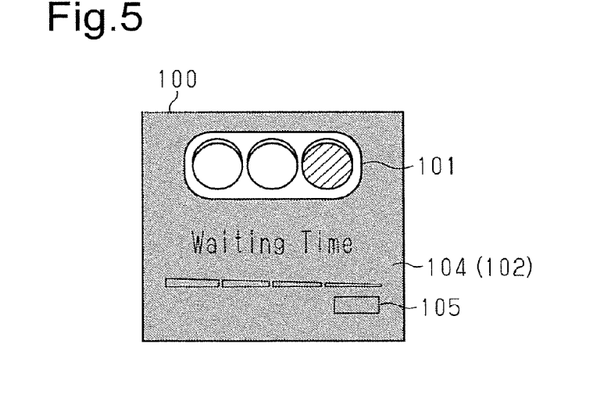
FIG. 5 shows a traffic signal information representation that is shown on the display unit of FIG. 1 when the remaining time of the red light is less than or equal to the predetermined value.

Thus, as shown in FIG. 5, when the remaining time T1 of the red light is less than or equal to the predetermined value Tp, the determination unit 22 reduces the brightness of the remaining time representation 103 (refer of FIG. 4) without changing the light representation 101. When reducing the brightness, the remaining time representation 103 does not change the representation configuration or show any new content. However, to facilitate understanding, the remaining time representation 103 with reduced brightness will be referred to as the remaining time invalid representation 104. The remaining time representation 103 shown in FIG. 4 is one example of a first representation. The remaining time invalid representation 104 shown in FIG. 5 is one example of a second representation.

The remaining time invalid representation 104 shows the bar representation 105 and the guide representation such as "waiting time," which shows the bar representation 105 to be the remaining time of the red light, with a brightness that is close to the background of the traffic signal information representation 100. In other words, the brightness of the remaining time invalid representation 104 is closer to the background of the traffic signal information representation 100 (background of remaining time representation 102) than the brightness of the remaining time representation 103. More specifically, the bar representation 105 and the guide representation such as "waiting time" are shown in light gray, that is, grayed out.

The remaining time invalid representation 104 stops shortening the bar representation 105 though the remaining time T1 decreases. More specifically, the length (form) of the bar representation 105 is maintained to correspond to the predetermined value Tp. The remaining time representation 103 and the remaining time invalid representation 104 will each hereinafter be simply referred to as the remaining time representation 102 as long as there is no need to distinguish one from the other.

In this manner, by changing the brightness of the remaining time representation 103, which is an attribute of the remaining time representation 103, without changing the representation configuration of the traffic signal information representation 100, flickering that occurs when the traffic signal information representation 100 changes is reduced. This avoids a situation that prompts the driver to look at the traffic signal information representation 100 when the driver is looking away from the traffic signal information representation 100.

Even when the driver looks at the remaining time invalid representation 104, the remaining time invalid representation 104 is grayed out. Thus, the driver easily understands that the remaining time invalid representation 104 is invalid. This prompts the driver to look ahead.

When the length of the bar representation 105 is maintained to correspond to the predetermined value Tp, the driver is deterred from suddenly starting the vehicle 1 in synchronism with when the remaining time T1 becomes "0." When the remaining time T1 reaches the predetermined value Tp, if the bar representation 105 is deleted, the driver would recognize that the remaining time has reached "0." However, such recognition would be avoided by stopping shortening the bar representation 105.

Figure 6:
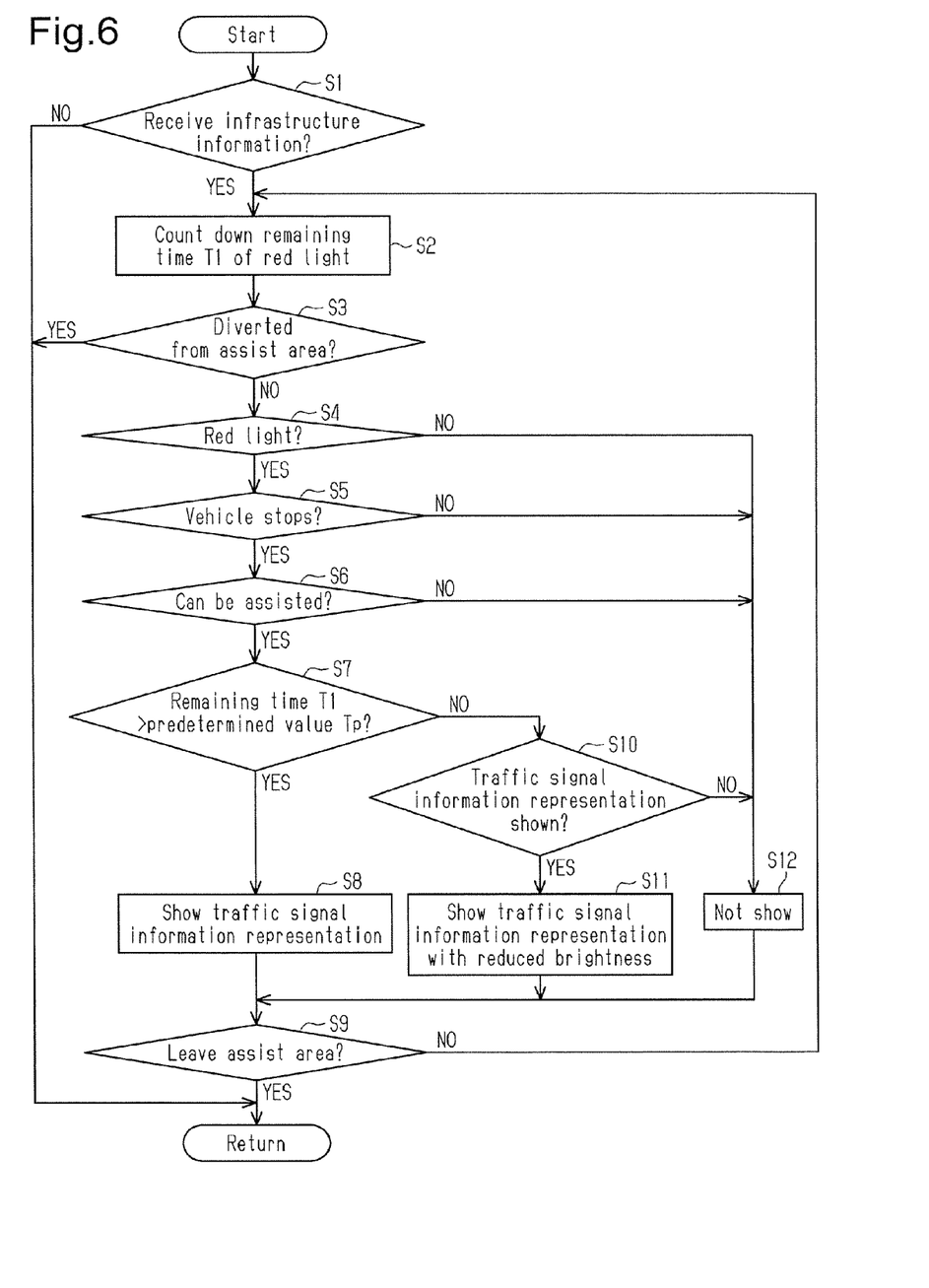
FIG. 6 is a flowchart showing the procedure of representation processing of the traffic signal information in the drive assist device of FIG. 1.

The operation of the drive assist device 20 and the procedure of representation processing of the traffic signal information will now be described with reference to FIG. 6. The representation processing of the traffic signal information is started when satisfying a starting condition such as the activation of a starting switch of the vehicle 1. The representation processing of the traffic signal information is ended when satisfying an ending condition such as the deactivation of the starting switch.

When the representation processing of traffic signal information is started, the analyzer 21 of the drive assist device 20 determines whether or not the vehicle communication device 10 of the vehicle 1 has received infrastructure information through road-to-vehicle communication (step S1). When the infrastructure information is not received (step S1: No), the analyzer 21 repeats step S1 and waits until receiving the traffic signal information.

When the analyzer 21 obtains the infrastructure information from the vehicle communication device 10 via the in-vehicle network NW, the analyzer 21 determines that the infrastructure information has been received (step S1: Yes). Then, the analyzer 21 analyzes the traffic signal information of the infrastructure information, extracts the current light and the remaining time, extracts other indications and the indication times, and sends the extracted information to the determination unit 22.

The determination unit 22 counts down the remaining time T1 of the red light based on the information obtained from the analyzer 21 (step S2). When the determination unit 22 receives the traffic signal information, if the light is not red, the time from the current light to the end of the red light may be counted down but does not have to be counted down the remaining time of the red light.

The determination unit 22 obtains, from the navigation system 30, link information or the like near the intersection where a traffic signal is provided. The determination unit 22 also obtains a current location that shows where the vehicle 1 is located on the road. Then, the determination unit 22 compares the current location of the vehicle 1 with the link information near the intersection to determine whether or not the vehicle 1 has been diverted from the assist area Z1 (step S3). For example, when the vehicle 1 enters a branching road between the point where the traffic signal information is received and the intersection where the traffic signal is provided, a link corresponding to the current location of the vehicle 1 differs from a link corresponding to the intersection that would have been passed. In such a case, the determination unit 22 determines that the vehicle 1 has left the assist area Z1 (step S3: Yes) and waits until receiving the next infrastructure information.

When the determination unit 22 of the drive assist device 20 determines that the vehicle 1 has not been diverted from the assist area Z1 (step S3: No), the determination unit 22 determines whether or not the current light is red (step S4). When the current light is not red (step S4: No), without showing the traffic signal information representation 100 (step S12), the determination unit 22 determines whether or not the vehicle 1 has passed through the intersection and left the assist area Z1 (step S9).

When the determination unit 22 determines that the vehicle 1 has left the assist area Z1 (step S9: Yes), the determination unit 22 resets the remaining time T1 of the red light, which has been counted down, and waits until receiving the next infrastructure information. When the determination unit 22 determines that the vehicle 1 is in the assist area Z1 (step S9: No), the determination unit 22 returns to step S2 and continues to count down the remaining time T1 of the red light.

When the determination unit 22 determines that the current light is red (step S4: Yes), the determination unit 22 determines whether or not the vehicle 1 has stopped based on the vehicle speed received from the vehicle speed sensor 11 (step S5). When the vehicle speed is less than or equal to a threshold value that is greater than "0 kilometers per hour," the determination unit 22 determines that the vehicle 1 has stopped. When the vehicle speed is greater than the threshold value, the determination unit 22 determines that the vehicle 1 is travelling. Instead, the determination unit 22 may determine that the vehicle has stopped when the vehicle speed is 0 kilometers per hour.

When the determination unit 22 determines that the vehicle 1 has not stopped (step S5: No), the determination unit 22 determines whether or not the vehicle 1 has left the assist area Z1 (step S9) without showing the traffic signal information representation 100 (step S12).

When the determination unit 22 determines in step S5 that the vehicle 1 has stopped (step S5: Yes), the determination unit 22 determines whether or not assistance can be performed by showing the traffic signal information representation 100 (step S6). For example, the determination unit 22 determines whether or not the vehicle 1 has crossed a stop line based on the location of the stop line and the current location of the vehicle. When the vehicle 1 has not crossed the stop line, the determination unit 22 determines that assistance can be performed.

The determination unit 22 determines whether or not the remaining time T1 of the red light is greater than the predetermined value Tp (step S7). When the remaining time T1 of the red light is greater than the predetermined value Tp (step S7, Yes), the determination unit 22 generates representation data of the traffic signal information representation 100 including the remaining time representation 103, outputs the representation data to the display unit 40, and shows the traffic signal information representation 100 on the display unit 40 (step S8).

After showing the traffic signal information representation 100 in such a manner, the determination unit 22 determines whether or not the vehicle 1 has left the assist area Z1 (step S9). When the vehicle 1 is in the assist area Z1 (step S9: No), the determination unit 22 returns to step S2 and continues to count down the remaining time T1 of the red light.

When the remaining time T1 of the red light is less than or equal to the predetermined value Tp (step S7, No), the determination unit 22 determines whether or not the traffic signal information representation 100 has been shown on the display unit 40 (step S10). When the determination unit 22 determines that the traffic signal information representation 100 has not been shown on the display unit 40 (step S10: No), the determination unit 22 determines whether or not the vehicle 1 has left the assist area (step S9) without showing the traffic signal information representation 100 (step S12). When the vehicle 1 has left the assist area (step S9: Yes), the determination unit 22 ends the representation processing for the traffic signal that is located ahead of a vehicle in the traveling direction and waits until receiving the next traffic signal information.

More specifically, when the traffic signal information representation 100 is not being shown on the display unit 40 (step S10: No) and the remaining time T1 of the red light is less than or equal to the predetermined value Tp at the timing the traffic signal information is received, the driver may become confused if the traffic signal information representation 100 including the remaining time invalid representation 104 with reduced brightness were to be shown since the remaining time representation was interrupted from the beginning. Further, if the traffic signal information representation 100 appears even though the remaining time T1 is small, the driver may shift his or her attention to the traffic signal information representation 100. Accordingly, by showing the traffic signal information representation 100 with reduced brightness (i.e., traffic signal information representation 100 including remaining time invalid representation 104) on the condition that the traffic signal information representation 100 (i.e., traffic signal information representation 100 including remaining time representation 103) has been shown, the driver can easily understand that the remaining time is small. Thus, the driver would not be confused.

When the determination unit 22 determines that the traffic signal information representation 100 has been shown (step S10: Yes), the determination unit 22 generates the representation data of the traffic signal information representation 100 including the remaining time invalid representation 104. Then, the determination unit 22 outputs the representation data to the display unit 40 and shows the traffic signal information representation 100 with reduced brightness (step S11).

Subsequently, the determination unit 22 determines whether or not the vehicle 1 has left the assist area Z1 (step S9). When the vehicle 1 has not left the assist area Z1 (step S9: No), the determination unit 22 returns to step S2 and continues to count down the remaining time T1 of the red light. When the light changes from red to green before the vehicle 1 reaches the intersection, that is, before the vehicle 1 stops in the assist area Z1, the determination unit 22 determines that the light is not red in step S4 (step S4: No) and does not show that the traffic signal information representation 100 (step S12).

As described above, the drive assist device of the present embodiment has the following advantages.

(1) When the remaining time T1 until the indication state of the traffic signal changes is less than or equal to the predetermined value Tp, the remaining time representation 102 showing the remaining time T1 is reduced in brightness. More specifically, the brightness, which is a representation attribute, is reduced without changing the configuration of the remaining time representation 102. In other words, the remaining time representation 102 is set to the remaining time invalid representation 104 (second representation), which differs from the remaining time representation 103 (first representation) in brightness. This reduces flickering that occurs when the representation changes so that the driver is not confused. In the present embodiment, the remaining time representation 102 is reduced in brightness without deleting the representation of the remaining time in the remaining time representation 102, which shows the remaining time T1, and without outputting a representation of different content. This further reduces flickering that occurs when the representation changes.

(2) If the bar representation 105, which shows the remaining time T1, is deleted when the remaining time T1 is less than or equal to the predetermined value Tp, the driver may recognize that the remaining time is "0." The drive assist device 20 stops changing the length of the bar representation 105 when the remaining time T1 is less than or equal to the predetermined value Tp. Thus, even when looking at the remaining time invalid representation 104, the driver would easily understand that the remaining time is small. Further, the length of the bar representation 105 is maintained to correspond to the predetermined value Tp. This deters the driver from suddenly starting the vehicle 1 in synchronism with when the remaining time is "0," which may happen when showing the actual remaining time that is less than or equal to the predetermined value Tp.

(3) The remaining time invalid representation 104 (second display) is output on the condition that the remaining time representation 103 (first display) has been shown. In other words, if the remaining time T1 becomes less than or equal to the predetermined value Tp before the remaining time representation 103 is shown, the remaining time invalid representation 104 is not output. For example, when the remaining time T1 of the red light is less than or equal to the predetermined value Tp at a timing of receiving traffic signal information, the driver may become confused if the remaining time invalid representation 104 is output without outputting the remaining time representation 103 since the remaining time representation was interrupted from the beginning. Accordingly, since the remaining time invalid representation 104 is output on the condition that the remaining time representation 103 has been shown, the driver would easily understand that the remaining time T1 is small.

(4) When the remaining time T1 of the red light is less than or equal to the predetermined value Tp, the brightness of showing the remaining time is reduced. This reduces flickering that occurs when the representation changes. Further, since the remaining time invalid representation 104 is grayed out, the driver would easily understand that the remaining time shown by the remaining time invalid representation 104 is invalid.

Second Embodiment

A drive assist device of a second embodiment will now be described focusing on differences from the first embodiment. The drive assist device of the present embodiment has the same basic configuration as the first embodiment. Thus, identical elements will not be described.

In the present embodiment, in the same manner as the first embodiment, when the remaining time of the red light is less than or equal to the predetermined value Tp, the remaining time invalid representation 104, which is the remaining time representation 103 with reduced brightness, is set. However, the present embodiment differs from the first embodiment in that the brightness of the remaining time representation 103 is reduced gradually. Gradual changing of the brightness includes changing the representation brightness in steps and in a non-continuous manner and continuously changing the representation brightness.

Figure 7A:
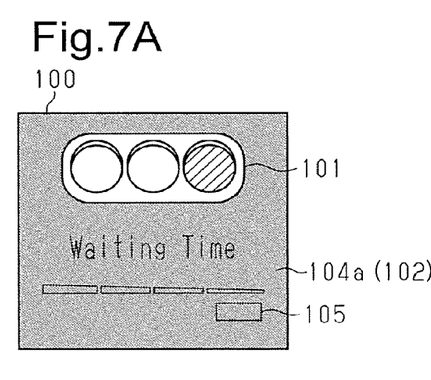
FIGS. 7A and 7B each show a traffic signal information representation that is shown when the remaining time of the red light is less than or equal to a predetermined value in a second embodiment to which a drive assist device according the present invention is applied, in which the traffic signal information representation gradually changes from FIG. 7A to FIG. 7B.

As shown in FIG. 7A, when the remaining time T1 reaches the predetermined value Tp, the brightness of the remaining time representation 103 (refer to FIG. 4) is reduced to be close to the background of the traffic signal information representation 100. This forms a remaining time invalid representation 104a. The shortening of the bar representation 105 is stopped at this time.

Figure 7B:
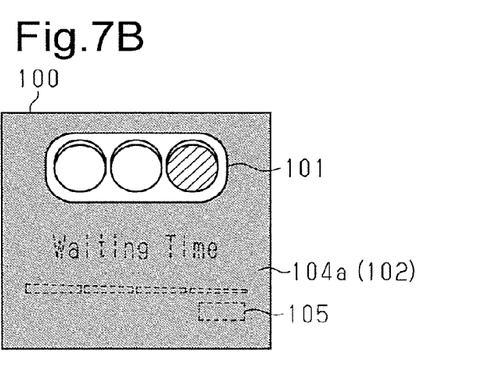

As shown in FIG. 7B, as the remaining time T1 further decreases, the brightness of the remaining time invalid representation 104a is further reduced than when the remaining time T1 reaches the predetermined value Tp. Alternatively, the saturation of the remaining time invalid representation 104a may be reduced in addition to the brightness.

Thus, since the brightness of the remaining time representation is gradually reduced after the remaining time T1 reaches the predetermined value Tp, the traffic signal information representation 100 becomes unnoticeable when the driver is not looking at the traffic signal information representation 100.

As described above, the drive assist device of the present embodiment has the following advantage in addition to advantages (1) to (4).

(5) When the remaining time T1 of the red light is less than or equal to the predetermined value Tp, the brightness of representation showing the remaining time T1 is gradually reduced. This reduces the amount of representation changes per unit of time. Thus, flickering that occurs when the representation changes is reduced.

Other Embodiments

It should be apparent to those skilled in the art that the present invention may be embodied in many other specific forms without departing from the spirit or scope of the invention. Particularly, it should be understood that the present invention may be embodied in the following forms.

In each of the above embodiments, when the current light is not red (step S4: No), when the vehicle 1 is travelling (step S5: No), and when it is determined that the assistance of showing the traffic signal information representation 100 cannot be performed (step S6: No), the traffic signal information representation 100 is not shown (step S12). Instead, in step S12, the remaining time invalid representation 104 is set as the remaining time representation. In this aspect, the traffic signal information representation 100 is shown in a predetermined region of the display unit 40 both when the vehicle 1 is travelling and stopped. However, when the vehicle 1 is travelling, or when the vehicle 1 is stopped and the remaining time T1 is less than or equal to the predetermined value Tp, the display unit 40 shows the traffic signal information representation 100 including the remaining time invalid representation 104. This also allows information to be shown so that the driver does not feel annoyed easily.

In each of the above embodiments, the traffic signal information representation 100 including the remaining time representation 103, which shows the remaining time of the red light, is shown on the display unit 40 when the remaining time T1 is greater than the predetermined value Tp, and the traffic signal information representation 100 including the remaining time invalid representation 104 is shown on the display unit 40 when the remaining time T1 is less than or equal to the predetermined value Tp. Instead, the traffic signal information representation 100 including the remaining time representation 103 may simply be shown on the display unit 40 when the vehicle 1 is stopped, and the traffic signal information representation 100 including the remaining time invalid representation 104 with reduced brightness may be shown on the display unit 40 when the vehicle 1 is travelling. Whether or not the remaining time is shown with the bar representation 105 or the like is determined by whether or not the drive assist device 20 obtains the remaining time. Thus, the brightness of showing the remaining time does not relate to the length of the remaining time. For example, the bar representation 105 is shown based on the remaining time T1 when the drive assist device 20 obtains infrastructure information through road-to-vehicle communication, and the bar representation 105 is stopped or deleted when the drive assist device 20 does not obtain infrastructure information. In such an aspect, when the vehicle is travelling and the remaining time until the indication state of a traffic signal changes does not need to be indicated, at least one of brightness, saturation, and hue of a representation that shows the remaining time is changed. More specifically, flickering that occurs when the representation changes is reduced by changing at least one of brightness, saturation, and hue, which are attributes of representation, while keeping the display configuration without deleting the representation of the remaining time and outputting a representation of different content. This reduces flickering that occurs in the representation showing the remaining time. This also makes the driver less annoyed.

In each of the above embodiments, when the remaining time T1 of the red light is less than or equal to the predetermined value Tp, the determination unit 22 reduces the brightness of the remaining time representation 103 (refer to FIG. 5) without changing the light representation 101, which shows the current light. Instead, when the remaining time T1 of the red light is less than or equal to the predetermined value Tp, both the light representation 101 and the remaining time representation 103 may be reduced in brightness.

In each of the above embodiments, the remaining time invalid representation 104 is a representation that stops shortening the bar representation 105 even though the remaining time T1 decreases. Instead, the bar representation 105 may be deleted.

Figure 8:
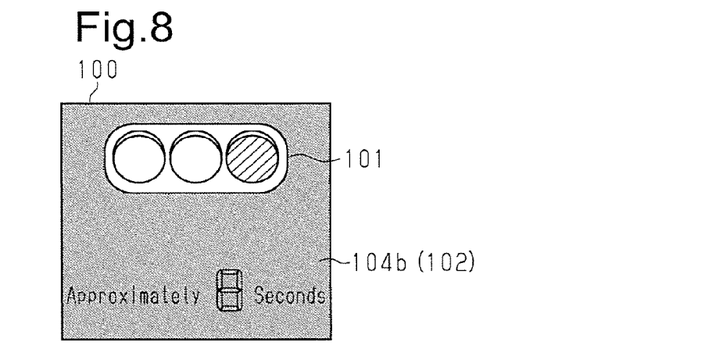
FIG. 8 shows a modified example of a traffic signal information representation that is shown when the remaining time of the red light is less than or equal to the predetermined value.

As shown in FIG. 8, the remaining time representation 102 does not have to be a symbolic representation such as a bar representation. Instead, the remaining time representation 102 may be a numerical representation that shows the remaining time by a value such as the number of seconds. When the remaining time T1 reaches the predetermined value Tp, the remaining time representation 102 is set to a remaining time invalid representation 104b with reduced brightness of the remaining time representation including a numerical representation. The remaining time invalid representation 104b may be a representation in which the remaining time is maintained to the predetermined value Tp. Alternatively, the remaining time invalid representation 104b does not have to show a specific remaining time by a value.

Figure 9:
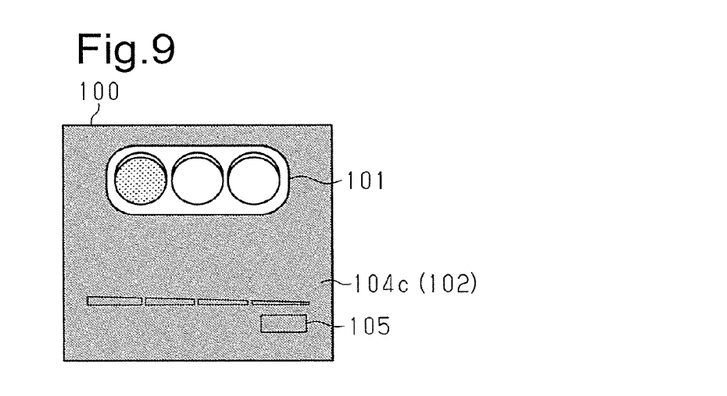
FIG. 9 shows a modified example of a traffic signal information representation that is shown when the remaining time of the green light is less than or equal to a predetermined value.

As shown in FIG. 9, the traffic signal information representation 100 may show the remaining time of the green light. In such a case, the traffic signal information representation 100 includes the light representation 101, which shows the green light, and the remaining time representation 102, which shows the remaining time of the green light. When the remaining time of the green light becomes less than or equal to the predetermined value Tp, the remaining time representation 102 is set to a remaining time invalid representation 104c with reduced brightness. This deters the driver from suddenly accelerating the vehicle 1 in synchronism with when the light changes from green to red.

The traffic signal information representation 100 only needs to make the driver recognize the current light and its remaining time. The traffic signal information representation 100 may omit or change the light representation 101. For example, the light representation 101 may be omitted when showing the guide representation of the remaining time representation as "waiting time for red light." Further, the light representation 101 does not have to show whether or not each light is indicated. The light representation 101 may only show the color of the current light.

In each of the above embodiments, the traffic signal information representation 100 is shown on the display unit 40 when the vehicle speed is less than or equal to a threshold value. However, when the light is, for example, red, the traffic signal information representation 100 may be shown regardless of vehicle speed.

In each of the above embodiments, it is determined whether the vehicle 1 is stopped or travelling based on the vehicle speed detected by the vehicle speed sensor 11. Instead, the determination may be made based on vehicle states detected by other detectors. For example, when braking the vehicle 1, it may be determined that the vehicle 1 is stopped. It may also be determined whether the vehicle 1 is stopped or travelling based on the acceleration detected by an acceleration sensor.

In each of the above embodiments, the traffic signal information representation is shown for a traffic signal that includes a single cycle of the green light, the yellow light, and the red light. Instead, the traffic signal information representation may be shown for a traffic signal in which the signal cycle includes an arrow light showing that a right turn is allowed or a left turn is allowed. For example, the road communication device 50 is provided for each lane and transmits, to the vehicle 1 that is travelling in the lane, information to distinguish lanes such as a right turn lane, a left turn lane, and a through lane, and traffic signal information that includes an arrow light as the signal cycle. The vehicle 1 that is travelling in the right turn lane receives traffic signal information showing that the vehicle 1 is currently travelling in the right turn lane. The vehicle 1 that is travelling in the through lane receives traffic signal information showing that the vehicle 1 is currently travelling in the through lane. When the drive assist device 20 of the vehicle 1 determines that the vehicle 1 is travelling in the right turn lane, the drive assist device 20 counts down the remaining time until the red light changes to an arrow light, which shows that a right turn is allowed, and reduces the brightness of the remaining time representation when the remaining time becomes less than or equal to the predetermined value Tp. When the drive assist device 20 of the vehicle 1 determines that the vehicle 1 is travelling in the through lane, the drive assist device 20 counts down the remaining time until the red light ends and reduces the brightness of the remaining time representation when the remaining time becomes less than or equal to the predetermined value Tp, regardless of a state of an arrow light.

In each of the above embodiments, when the remaining time until the indication state changes is less than or equal to the predetermined value Tp, the brightness of the remaining time representation is reduced. Instead, when the background of the traffic signal information representation 100 has a high brightness like white, the brightness of the remaining time representation may be increased in accordance with the base. Even in such a case, the remaining time representation is assimilated into the traffic signal information representation 100. Thus, changes in the dimming rate are reduced. This reduces flickering as compared with when the remaining time representation is changed to other content. This also makes the driver easily understand that the remaining time is invalid.

In each of the above embodiments, the brightness of the remaining time representation is reduced when the remaining time until the indication state changes is less than or equal to the predetermined value Tp. Instead, when the remaining time is less than or equal to the predetermined value Tp, the saturation or hue of the remaining time representation may be changed. Alternatively, two or three of the brightness, saturation, and hue may be changed. For example, when the remaining time until the indication state changes is less than or equal to the predetermined value Tp, if the saturation of the remaining time representation is reduced, the representation becomes substantially gray or black. Further, when the background of the traffic signal information representation 100 is blue, the hue of a first remaining time representation may be set to a color other than blue, and the hue of a second remaining time representation may be set to a blue that is close to the background. Flickering is reduced more effectively by reducing the saturation and brightness in addition to the hue.

In each of the above embodiments, the remaining time until the indication state changes is notified to the driver by showing an image on the display unit 40. In addition, the notification may be made by outputting, from a speaker, a voice that prompts to check the remaining time and to look ahead.

In each of the above embodiments, the drive assist device 20 obtains a current location from the navigation system 30. Instead, the drive assist device 20 may identify a current location by using location information that is obtained from the location detector 12. Further, the drive assist device 20 may use image data that is taken by an in-vehicle camera to recognize a stop line on the road so that the current location of the vehicle 1 is identified from a location relative to the stop line.

In each of the above embodiments, the drive assist device 20 obtains the remaining time until the indication state changes. Instead, the road communication device 50 may obtain the remaining time in advance and transmit to the vehicle 1 the obtained remaining time including infrastructure information.

In each of the above embodiments, the vehicle communication device 10 receives, from the road communication unit 51, the information that includes, for example, the remaining indication time and the subsequent indication time. Instead, the vehicle communication device 10 may receive, from the road communication unit 51, raw data that is used to calculate the remaining indication time and the subsequent indication time so that the drive assist device 20 uses the raw data to calculate, for example, the remaining indication time, the subsequent indication time, and the signal cycle.

In each of the above embodiments, the drive assist device 20 obtains traffic signal information from the road communication device 50. Instead, the drive assist device 20 may obtain the traffic signal information from, for example, a center that integrally controls the signal cycles of traffic signals. The drive assist device 20 may also obtain the traffic signal information from a portable information terminal that is brought into the vehicle and receives the information from such a center.

The drive assist device 20 may be arranged in the navigation system 30 and may be arranged as part of the function of the navigation controller 31. Further, the drive assist device 20 may be a portable information terminal that is brought into the vehicle. In such a case, the drive assist device 20 may obtain traffic signal information from, for example, the road communication device 50 and show the traffic signal information on the display unit of the portable information terminal.

The present examples and embodiments are to be considered as illustrative and not restrictive, and the invention is not to be limited to the details given herein, but may be modified within the scope and equivalence of the appended claims.

The invention claimed is:

1. A drive assist device that assists a driver who is driving a vehicle by showing, on a display unit, information related to an indication state of a traffic signal including a remaining time until the indication state of the traffic signal changes, the drive assist device comprising:
  a processor configured to output a representation of the remaining time to the display unit, wherein
  the processor is configured to set the representation of the remaining time to a first representation when the remaining time is greater than a predetermined value and set the representation of the remaining time to a second representation when the remaining time is less than or equal to the predetermined value, wherein the second representation differs from the first representation in at least one of brightness, saturation, and hue,
  wherein at least one of brightness, saturation, and hue of the second representation is closer to a background of the representation of the remaining time than the first representation.

2. The drive assist device according to claim 1, wherein the representation of the remaining time includes a numerical representation or a symbolic representation, and
  the processor is configured to maintain the second representation at a value or symbol that corresponds to the predetermined value when the remaining time is less than or equal to the predetermined value.

3. The drive assist device according to claim 1, wherein the processor is configured to set the representation of the remaining time to the second representation on the condition that the representation of the remaining time has been set to the first representation.

4. The drive assist device according to claim 1, wherein the processor is configured not to output the representation of the remaining time to the display unit when the remaining time becomes less than or equal to the predetermined value before the representation of the remaining time is set to the first representation.

5. The drive assist device according to claim 1, wherein the remaining time until the indication state of the traffic signal changes is a remaining time until a first indication state that instructs the vehicle to stop changes to a second indication state indicating that the vehicle is allowed to pass, wherein the processor is configured to:
  set the representation of the remaining time to the first representation when the indication state is the first indication state and the remaining time is greater than the predetermined value;
  set the representation of the remaining time to the second representation when the indication state is the first indication state and the remaining time is less than or equal to the predetermined value; and
  set the representation of the remaining time to the second representation when the indication state is not the first indication state.

6. A drive assist device that assists a driver who is driving a vehicle by showing, on a display unit, information related to an indication state of a traffic signal including a remaining time until the indication state of the traffic signal changes, the drive assist device comprising:
  a processor configured to output a representation of the remaining time to the display unit, wherein
  the processor is configured to set the representation of the remaining time to a first representation when the remaining time is greater than a predetermined value and set the representation of the remaining time to a second representation when the remaining time is less than or equal to the predetermined value, wherein the second representation differs from the first representation in at least one of brightness, saturation, and hue,
  wherein the processor is configured to stop decreasing the remaining time shown in the second representation when the remaining time is less than or equal to the predetermined value.

7. A drive assist device that assists a driver who is driving a vehicle by showing, on a display unit, information related to an indication state of a traffic signal including a remaining time until the indication state of the traffic signal changes, the drive assist device comprising:
  a processor configured to output a representation of the remaining time to the display unit, wherein
  the processor is configured to set the representation of the remaining time to a first representation when the remaining time is greater than a predetermined value and set the representation of the remaining time to a second representation when the remaining time is less than or equal to the predetermined value, wherein the second representation differs from the first representation in at least one of brightness, saturation, and hue,
  wherein the processor is configured to gradually change at least one of brightness, saturation, and hue of the second representation when the remaining time is less than or equal to the predetermined value.

8. A drive assist device that assists a driver who is driving a vehicle by showing, on a display unit, information related to an indication state of a traffic signal including a remaining time until the indication state of the traffic signal changes, the drive assist device comprising:
  a processor configured to output a representation of the remaining time to the display unit, wherein
  the processor is configured to set the representation of the remaining time to a first representation when the remaining time is greater than a predetermined value and set the representation of the remaining time to a second representation when the remaining time is less than or equal to the predetermined value, wherein the second representation differs from the first representation in at least one of brightness, saturation, and hue,
  wherein the second representation has a lower brightness than the first representation.

9. A drive assist device that assists a driver who is driving a vehicle by showing, on a display unit, information related to an indication state of a traffic signal including a remaining time until the indication state of the traffic signal changes, the drive assist device comprising:
  a processor configured to output a representation of the remaining time to the display unit, wherein the processor is configured to:
  determine whether the vehicle is travelling or stopped;

set the representation of the remaining time to a first representation when the vehicle is stopped; and set the representation of the remaining time to a second representation when the vehicle is travelling, wherein the second representation differs from the first representation in at least one of brightness, saturation, and hue, wherein at least one of brightness, saturation, and hue of the second representation is closer to a background of the representation of the remaining time than the first representation.

10. A drive assist device that assists a driver who is driving a vehicle by showing, on a display unit, information related to an indication state of a traffic signal including a remaining time until the indication state of the traffic signal changes, the drive assist device comprising:

a processor configured to output a representation of the remaining time to the display unit, wherein the processor is configured to:

determine whether the vehicle is travelling or stopped;

set the representation of the remaining time to a first representation when the vehicle is stopped; and set the representation of the remaining time to a second representation when the vehicle is travelling, wherein the second representation differs from the first representation in at least one of brightness, saturation, and hue, wherein the second representation has a lower brightness than the first representation.

* * * * *